United States Patent [19]
McGlone et al.

[11] Patent Number: 4,655,660
[45] Date of Patent: Apr. 7, 1987

[54] LOW-PROFILE FASTENER

[75] Inventors: John T. McGlone, Richboro; Ralph L. McGiboney, Feasterville, both of Pa.

[73] Assignee: The United States of America as represented by the Secretary of the Navy, Washington, D.C.

[21] Appl. No.: 704,124

[22] Filed: Feb. 22, 1985

[51] Int. Cl.$^4$ .................. F16B 35/00; F16B 37/08
[52] U.S. Cl. ................................. 411/366; 411/432
[58] Field of Search .................. 411/16–18, 411/339, 338, 366, 367, 432, 433, 178, 427, 438, 902, 903, 931, 932; 10/86 R

[56] References Cited

U.S. PATENT DOCUMENTS

| | | |
|---|---|---|
| 2,521,567 | 9/1950 | Corrigan et al. |
| 2,632,355 | 3/1953 | Becker. |
| 3,279,519 | 10/1966 | Neuschotz ............... 411/178 |
| 3,280,874 | 10/1966 | Rosan ...................... 411/178 |
| 3,281,173 | 10/1966 | Rosan ...................... 411/178 |
| 3,342,096 | 9/1967 | Bobrowski ............... 411/393 |
| 3,419,298 | 12/1968 | Worley .................... 403/24 |
| 3,695,139 | 10/1973 | Howe ...................... 411/432 |

FOREIGN PATENT DOCUMENTS

| | | | |
|---|---|---|---|
| 2358577 | 2/1978 | France .................... 411/178 |
| 64540 | 2/1913 | Switzerland ............. 411/339 |
| 824012 | 11/1959 | United Kingdom ...... 411/427 |
| 573624 | 9/1977 | U.S.S.R. .................. 411/427 |

Primary Examiner—Gary L. Smith
Assistant Examiner—Neill Wilson
Attorney, Agent, or Firm—Robert F. Beers; Henry Hansen

[57] ABSTRACT

A low-profile fastener for securing parts such as sway-brace pads, mounting blocks and suspension loops onto exterior surfaces of multiple ejector racks in aircraft. The fastener consists of a retainer housing formed with an annular neck and a thin wrench head, and an insert threaded into the nut with internal threads. The fastener neck is inserted from within the rack through a mounting hole aligned with a hole of the part to be secured. A bolt inserted through the holes from the exposed side of the part is screwed into the insert and tightened to the desired torque. The thin wrench head is the only portion of the fastener protruding into the rack.

1 Claim, 2 Drawing Figures

LOW-PROFILE FASTENER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to fasteners for securing parts to the exterior surface of hardware having limited interior space; and more particularly to a light weight, high strength, low-profile fastener suitable for use with approved military specification thin wall self-locking inserts.

Multiple ejector racks used on aircraft for dispensing stores generally include hardware such as swaybrace pads, mounting blocks, suspension loops, etc., mounted onto the exterior surfaces. Conventional blind-nut fasteners installed by compression of a nut have been used to secure the hardware but their use is limited only to areas where there is sufficient interior space to allow the fasteners to protrude into the rack without interfering with mechanisms and components installed within the rack. New design configurations of multiple ejector racks have further limited use of such fasteners because there is even less interior space available for protrusion but with sufficient clearance for a reacting wrench. In addition, compression-installed blind-nut fasteners frequently loosen under the high intermittent loadings often encountered in aircraft environments. This is due to the further compression of the nut after its initial tightening.

SUMMARY OF THE INVENTION

Accordingly, it is an object of the present invention to provide a fastener for securing external components to a support structure having severely limited interior space, which will not loosen under high intermittent loadings, and which exhibits overall high-tensile strength. Another object is to provide a fastener which is relatively simple to manufacture and install, which is light weight and corrosion resistant, and which uses standard Military Specification screw-thread inserts, with or without internal thread-lock. Still another object is to provide a low-profile fastener which can readily replace the conventional compression-type blind-nut fastener in existing structures.

Briefly, these and other objects of the invention are accomplished by a low-profile fastener assembly consisting of a retaining nut housing and insert. The nut housing includes an annular neck flanged at one end to form a thin wrench head. The insert has external threads engaging the nut housing, and internal threads for engaging a standard bolt. To join to adjacent structures, each having a fastener hole aligned with the other, the boss with the insert in place, is inserted in the hole of one structure with the head abutting the exposed side; then the bolt is inserted through the hole of the other structure from its exposed side and turned into the insert until tightened to the desired torque. The insert is swaged into the nut housing for permanent retention, and may include locking-type internal or external threads.

For a better understanding of these and other objects of the present invention, reference may be made to the following description taken in conjunction with the accompanying drawings wherein:

DESCRIPTION OF THE PREFERRED EMBODIMENT

Figure 1:
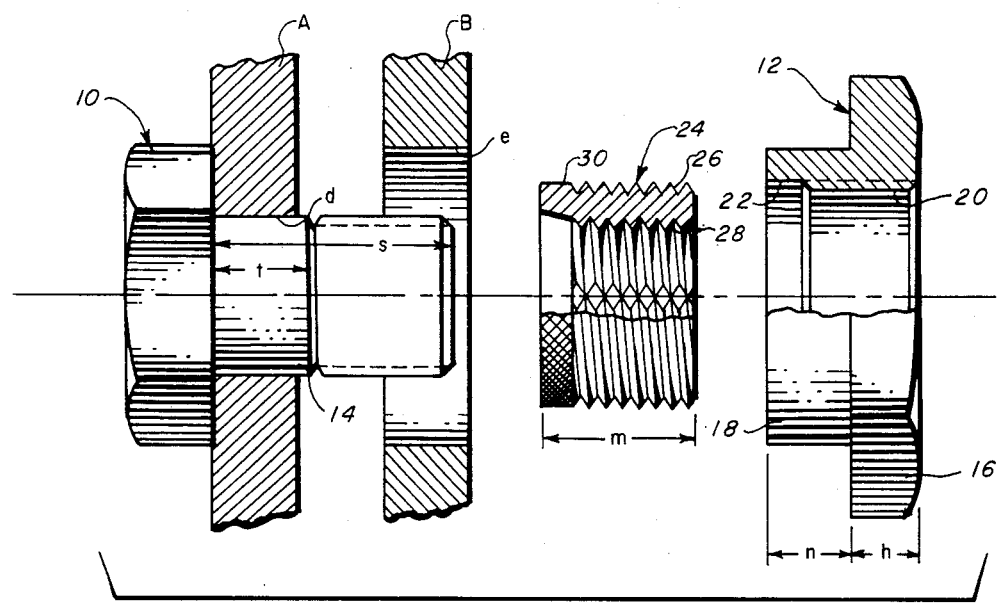
FIG. 1 is a disassembled view, partially in cross-section, of a low-profile fastener according to the invention arranged to join two structural members.

Referring now to the drawing wherein like characters designate like or corresponding parts throughout the several views, there is shown in FIG. 1 two structural members A and B having fastener holes d and e coaxially aligned for receiving a standard size bolt 10 and a retaining nut housing 12. The bolt size is selected to slidably fit through hole d, with a grip length t, preferably equal to the thickness of member A and a shank length s, for obtaining maximum thread contact with an insert 24 in housing 12. The housing 12 includes a standard hex head 16 with an annular neck or boss 18 dimensioned for slideable insertion in hole e. The length n of boss 18 is preferably equal to but not exceeding the thickness of member B, and the height h of head 16 is preferably limited to the minimum amount necessary to provide the strength required, while providing a total housing length n+h sufficient to install the inset of length m thereby minimizing the amount the fastener protrudes from the exposed surface of member B when joined to member A. Threads 20 in the bore of housing 12 extend from the head-end and terminate at a recess 22 which, in turn, extends into the bore from the boss-end of housing 12. The inside diameter of recess 22 is at least coextensive with the root diameter of threads 20.

As applied to aircraft ejector racks, the ultimate tensile strength of the material of the bolt 10 is considerably higher than the material of housing 12. By using a high strength insert between housing 12 and bolt 10, the threads in housing 12 may be enlarged to provide a working component strength higher than that of bolt 10. The threads 20 and recess 22 of housing 12 are therefore formed to receive an approved Military Standard screw-thread, thin-wall locking or non-locking type insert 24, such as MIL-I-45932/1A, having external and internal threads 26 and 28, respectively, and an expandable, knurled boss 30 at one end for swaging into nut recess 22 when insert 24 is fully screwed into nut 12.

Bolt 10 is preferably a high strength, hardened steel of 165,000 to 185,000 psi ultimate tensile strength. Housing 12 is preferably fabricated from standard 7075 T 651 aluminum alloy hex stock having an ultimate tensile strength equal to or greater than 65,000 psi. No heat treatment is necessary, although an artificial aging process by "baking" for a specified time well-known in the art promotes corrosion resistance. The bore of housing 12 is threaded to accomodate insert 24 which is fabricated from a corrosion resistant steel such as 17-4PH. The hex stock size and external diameter of the neck 18 is selected to insure strength at least equal to the breaking tensile strength of the bolt 10. Other materials are contemplated so long as their dimensions and geometry meet the required breaking strength and military specifications.

Figure 2:
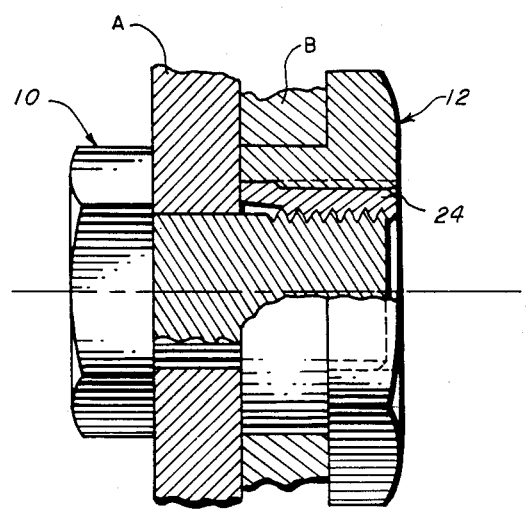
FIG. 2 is an assembled view, partially in cross-section, of the fastener of FIG. 1 after the structural members have been joined.

Referring now to the assembled view of the fastener in FIG. 2, its operation and use will become apparent.

The insert 24 and housing 12 are assembled and swaged together as an integrated component prior to use. In use, holes d and e of members A and B are aligned, and the boss 18 of housing 12 with swaged insert 24 is inserted in member B. Bolt 10 is then inserted in member A and turned into the internal threads of insert 24 until members A and B are drawn together and positively joined to the desired torque or compression. The clearance on the exposed side of member B from other mechanisms and components must be sufficient to allow a reacting wrench to be accomodated on wrench head 16.

Some of the many advantages and novel features of the invention as described should now be readily apparent. For example, a light-weight, high-strength fastener is provided for securing structural members in which one of the members has severely limited interior space precluding use of a typical high-profile compression-installed blind-nut fastener. The novel fastener of the present invention minimizes protrusion of the fastener into limited clearance spaces. Its construction is such that high intermittent loadings can be tolerated without loosening of the fastener while also providing overall high-tensile strength which can be manufactured and installed with relative ease. It is adaptable for use with approved Military Standard screw-thread bolts and inserts, with or without internal thread-lock. It is also capable of being dimensioned to be retrofitted into fastener holes where conventional compression-installed blind-nut fasteners were previously used.

It will be understood that various changes in the details, steps and arrangement of parts which have been herein described and illustrated to explain the nature of the invention, may be made by those skilled in the art within the principle and scope of the invention as expressed in the appended claims.

What is claimed is:

1. A low-profile fastener for securing one member to the exterior surface of another member, the other member having limited interior clearance, comprising:

a housing having an annular neck at one end of length equal to the thickness of the other member and flanged at the other end to form a thin wrench head, said neck formed to slidably insert the entire length thereof in a mounting hole in the other member from the interior surface thereof;

an insert equal to the length of said housing, having an annular boss at one end for swaging into said one end of the said housing, and threadingly engaged in said housing for the remaining length thereof and having internal threads; and a bolt formed to pass through a mounting hole in the one member from the exterior surface thereof and to threadingly engage said insert the entire threaded length thereof, said bolt having a shank length equal to the combined thickness of the members and said wrench head.

* * * * *